US007828366B2

(12) United States Patent
Andre et al.

(10) Patent No.: US 7,828,366 B2
(45) Date of Patent: Nov. 9, 2010

(54) MOTOR VEHICLE DOOR

(75) Inventors: Gerald Andre, Amberieu En Bugey (FR); Fabien Delwal, Chalamont (FR); Denis Barral, Montalieu Vercieu (FR); Jerome Fillon, Le Puy En Velay (FR); Hugues Cheron, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 135 days.

(21) Appl. No.: 12/230,674

(22) Filed: Sep. 3, 2008

(65) Prior Publication Data
US 2009/0102221 A1 Apr. 23, 2009

(30) Foreign Application Priority Data
Sep. 3, 2007 (FR) .................................. 07 57319

(51) Int. Cl.
*B60J 5/02* (2006.01)
(52) U.S. Cl. .................. 296/146.8; 296/56; 296/146.11
(58) Field of Classification Search .................. 296/56, 296/146.8, 146.11; 49/502
See application file for complete search history.

(56) References Cited
U.S. PATENT DOCUMENTS 5,997,072 A * 12/1999 Parkinson ................. 296/146.8
6,007,139 A * 12/1999 Shave ...................... 296/146.8
6,454,341 B2 * 9/2002 Tolinski ................... 296/146.8
6,471,284 B2 * 10/2002 Landmesser .............. 296/146.8
6,505,882 B1 * 1/2003 Morbach et al. ....... 296/146.11
7,156,450 B2 * 1/2007 McIntyre et al. ......... 296/146.8
7,401,832 B2 * 7/2008 Yui et al. ............... 296/146.11
2002/0121798 A1 * 9/2002 Landmesser .............. 296/146.8

FOREIGN PATENT DOCUMENTS

| DE | 19907391 A1 | 8/2000 |
|---|---|---|
| EP | 1764248 A2 | 3/2007 |
| JP | A-60-240519 | 11/1985 |
| WO | WO 2005/042287 A1 | 5/2005 |

* cited by examiner

*Primary Examiner*—Lori L Lyjak
(74) *Attorney, Agent, or Firm*—Oliff & Berridge, PLC

(57) ABSTRACT

The rear unit comprises first and second doors for a motor vehicle. The first and second doors respectively comprise first and second tailgates, the second door carrying the first tailgate. The first rear door has hinge means for hinging the first tailgate relative to the body of the motor vehicle, which means are fastened to the first tailgate. The first tailgate is pivotally movable relative to the body about a main pivot axis of the hinge means. The main axis is also suitable for moving in at least one guide slideway for guiding the main pivot axis in translation relative to the body in a direction that is substantially parallel to the longitudinal direction of the vehicle.

13 Claims, 7 Drawing Sheets

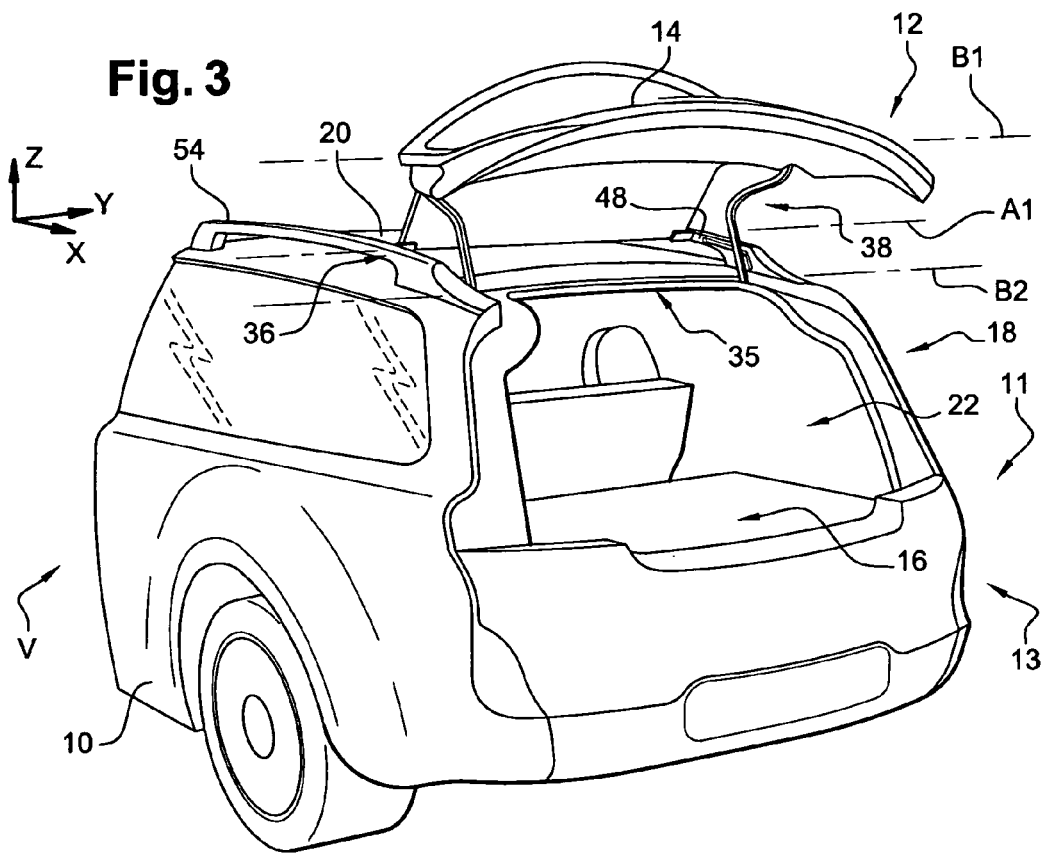
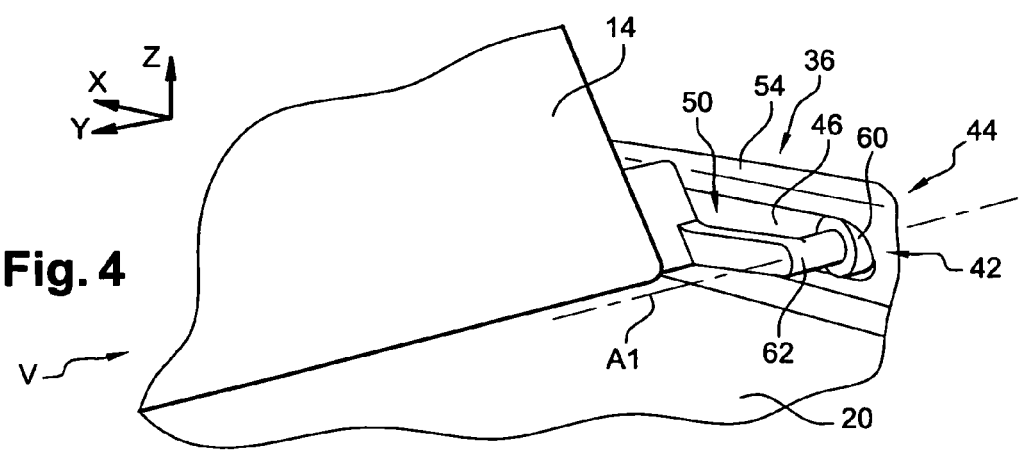

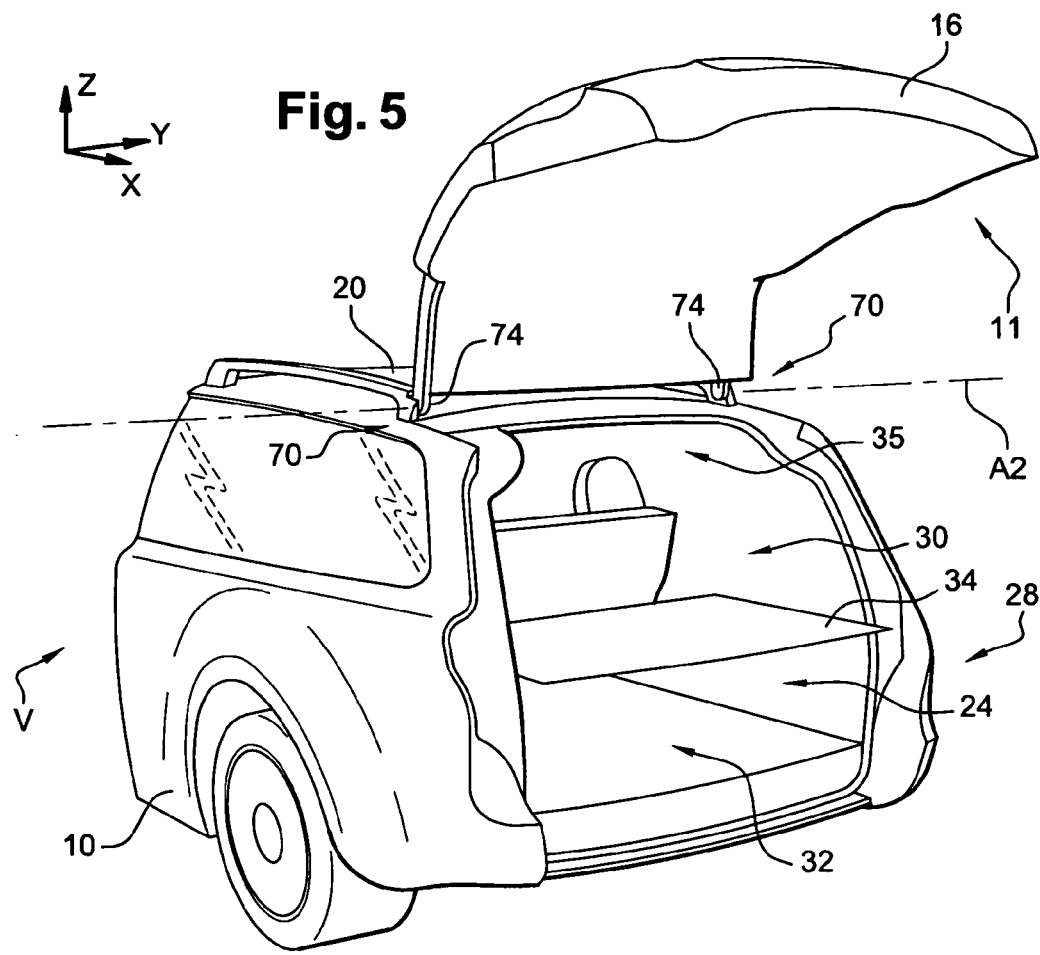
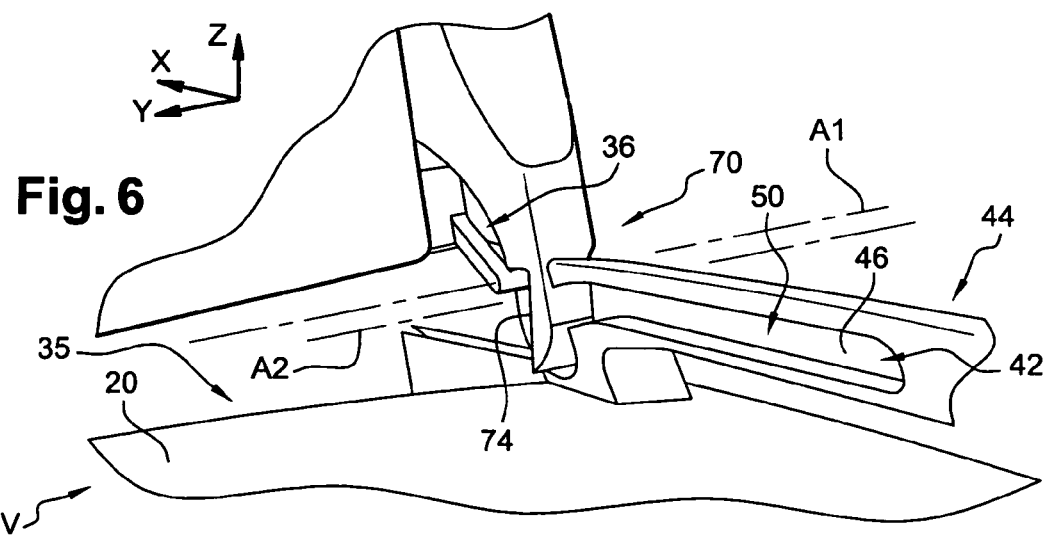

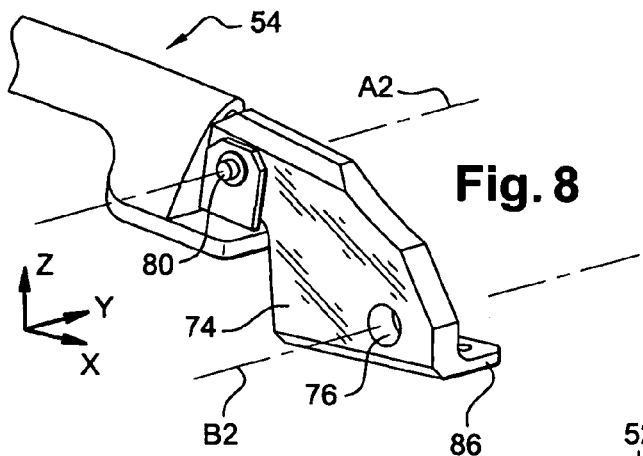
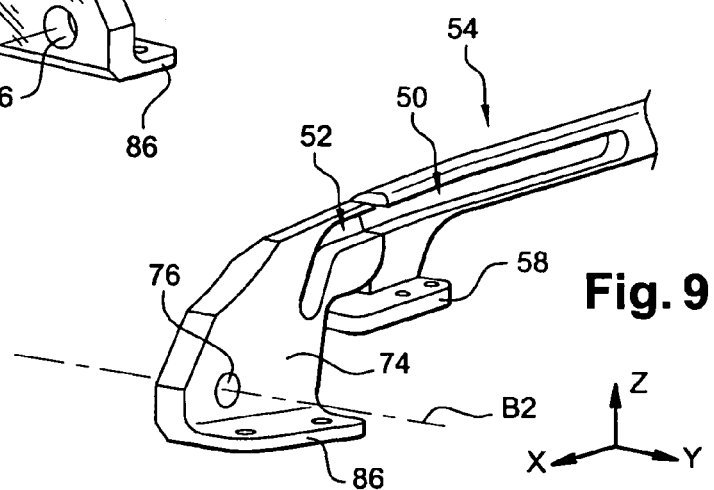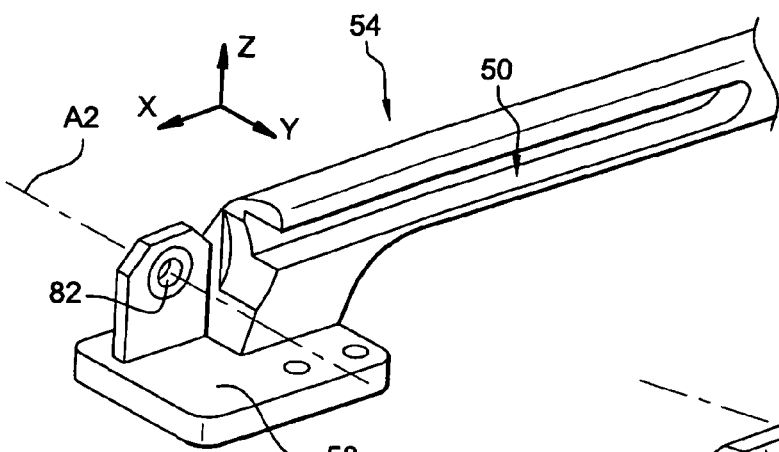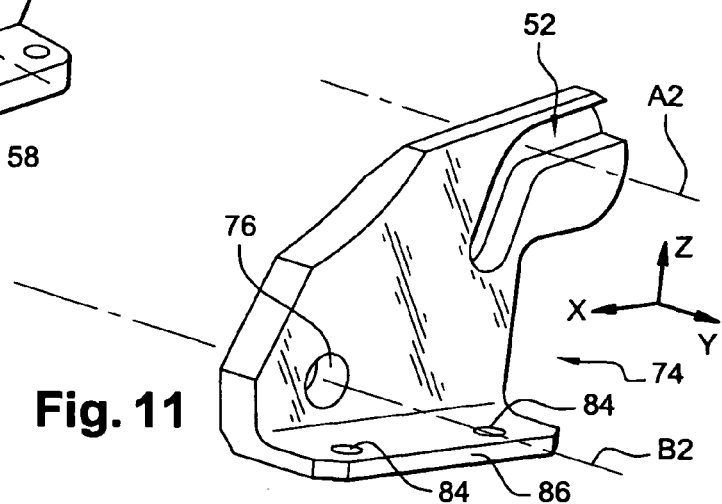

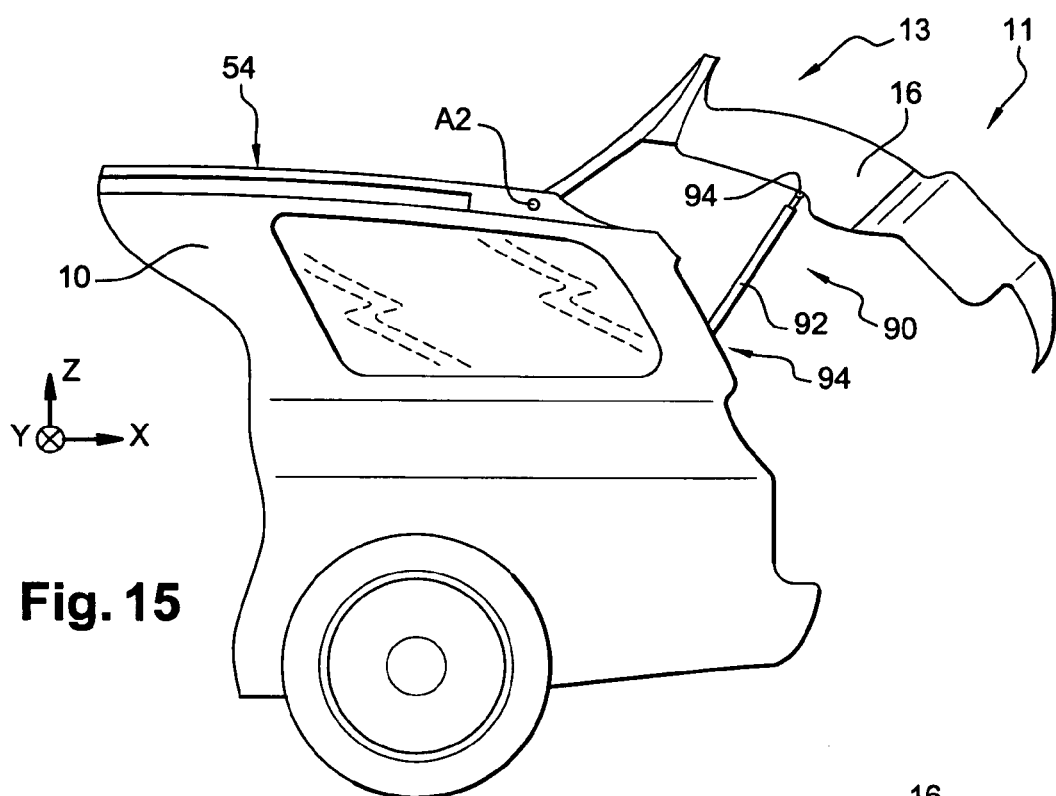
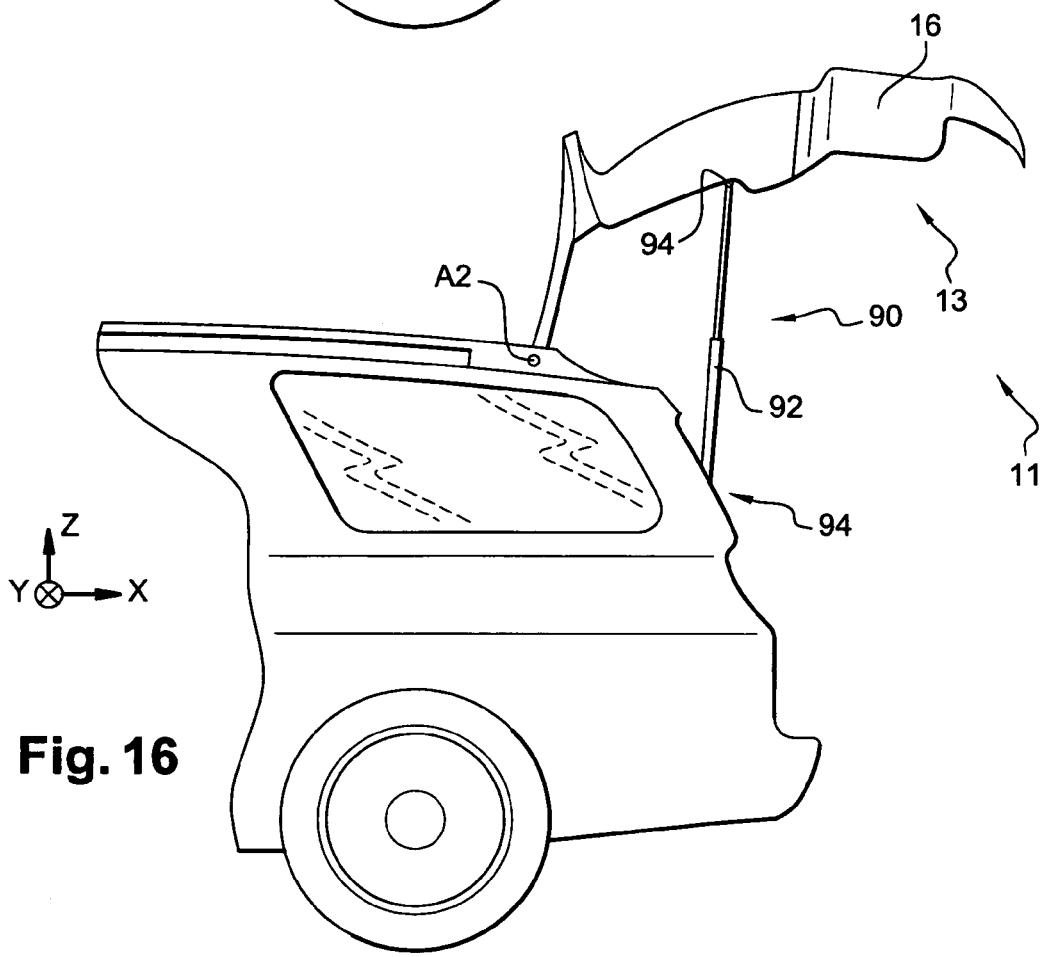

MOTOR VEHICLE DOOR

FIELD OF THE INVENTION

The present invention relates to motor vehicle doors.

It relates particularly, but not exclusively, to vehicles fitted with longitudinal roof bars, e.g. vehicles of the station wagon or minivan type.

BACKGROUND OF THE INVENTION

Document WO 2005/042287 discloses a unit of first and second rear doors for a motor vehicle, respectively comprising first and second tailgates. In that unit, the second door carries the first tailgate. The term "tailgate" is used to mean an element situated behind the roof or the floor of the motor vehicle, for uncovering access to the inside of the motor vehicle by being opened towards the top portion of the vehicle.

The first door has hinges fastened to the top portion of the second door with the main pivot axis thereof being parallel to a transverse direction of the vehicle. Those hinges are fastened to the first tailgate and to the second door and they form hinge means for hinging the first tailgate relative to the second door. Those hinges enable the tailgate to pivot relative to the second door about a first main pivot axis of the hinge means.

The first tailgate is movable between an open position in which it uncovers at least part of an access to the inside of the vehicle, and a closed position in which it shuts said access. This access is defined by an opening formed in the second door.

For practical reasons, it is desirable for the access to be as large as possible.

Although smaller than the second tailgate, the first tailgate nevertheless presents dimensions that are relatively large in order to provide access that is relatively large. During opening and closing of the first tailgate, these large dimensions give rise to a large amount of space being occupied in the longitudinal direction of the vehicle, firstly because of the path followed by the first tailgate as it pivots relative to the body of the vehicle, and secondly by the extension to the vehicle that is formed by the first tailgate when in its open position. This occupation of longitudinal space is particularly penalizing when the first tailgate is close to and facing a wall or another vehicle.

OBJECT AND SUMMARY OF THE INVENTION

An object of the invention is to provide a door unit in which the first tailgate occupies as little longitudinal space as possible, while nevertheless conserving access that is as large as possible.

To this end, the invention provides a unit of first and second rear doors for a motor vehicle, the first and second doors respectively comprising first and second tailgates, the second door carrying the first tailgate, in which unit the first door includes hinge means for hinging the first tailgate relative to a vehicle body, said means being fastened to the first tailgate, the first tailgate being pivotally movable relative to the body about a main pivot axis of the hinge means, the main axis being suitable for moving in at least one guide slideway for guiding the main axis in translation relative to the body in a direction that is substantially parallel to the longitudinal direction of the vehicle, between:

an open position corresponding to an open position of the first tailgate, in which the tailgate uncovers at least part of an access to the inside of the vehicle and is superposed, at least in part, on a roof of the vehicle; and a closed position corresponding to a closed position of the first tailgate, in which the first tailgate shuts the access to the inside of the vehicle.

In the open state the first tailgate occupies relatively little longitudinal space, regardless of its size.

Since the main pivot axis is guided to move in translation in a direction that is substantially parallel to the longitudinal direction of the vehicle, the first tailgate presents an open position in which it is superposed at least in part over the roof of the vehicle. Thus, in the longitudinal direction of the vehicle, the size of the extension that is formed by the first tailgate in its open position is less than the size of the first tailgate itself in the longitudinal direction when it is in its open position. Thus, in its open position, the first tailgate occupies relatively little space, constituting little static obstruction.

Furthermore, the combined movements in pivoting and in translation of the first tailgate relative to the second door enable the path followed by the first tailgate to be modified. The door unit of the invention enables the first tailgate to pivot while simultaneously moving in translation towards the front of the vehicle so that the longitudinal space occupied by the tailgate as it moves is likewise relatively small, constituting little dynamic obstruction.

Furthermore, the first tailgate occupies relatively little space vertically, but without that hindering the user while it is in the open position. Since the first tailgate is superposed at least in part over the roof of the vehicle while in its open position, there is no need for the first tailgate to rise to a great height in order to keep out of the way of the user. The first tailgate occupies a relatively low position, preferably close to the roof of the vehicle, so as to reduce the vertical space it occupies to as little as possible, and to do so without limiting clearance under the door.

Another advantage of the door unit of the invention is that it enables the first tailgate to be opened and closed more quickly. The combined movements in pivoting and in translation of the first tailgate relative to the body cause it to move along a stroke that is shorter than a conventional stroke in which the first tailgate is movable solely in pivoting relative to the second door. This enables the useful portion of the trunk to be cleared more quickly.

Advantageously, the access uncovered by the first tailgate in its open position is defined by an opening formed in the second door.

According to an optional characteristic of the door unit of the invention, with the hinge means for hinging the first tailgate relative to the body being first hinge means, the first door includes second hinge means for hinging the first tailgate and the second door relative to each other, the second hinge means being fastened to the first tailgate and to the second door, the second hinge means being pivotally movable relative to the first tailgate and to the second door respectively about first and second secondary pivot axes of the second hinge means.

The second hinge means serve to impose a particular path on the first tailgate while it is opening or closing. The second hinge means present geometrical and dynamic characteristics that can be modified as a function of the particular geometry of the vehicle. For example, the second hinge means may be pneumatic props or one or more rigid links.

With a rigid link, the geometrical characteristics that enable the tailgate to be adapted to vehicles of different types comprise in particular the distance between the secondary pivot axes and the shape of the link.

According to an optional characteristic of the door unit of the invention, the unit includes motor-driven means suitable for generating torque about the second secondary pivot axis of the second hinge means.

In an embodiment of the door unit of the invention, the motor-driven means include means for transmitting torque to the second secondary pivot axis.

In another embodiment of the door unit of the invention, the motor-driven means include means for movement in translation, e.g. means for applying traction to the main pivot axis. These means can then be integrated in the roof bars.

Optionally, with the access uncovered by the first tailgate being a first access and the main pivot axis of the first tailgate being a first main axis, the second tailgate is pivotally movable relative to the body of the vehicle about a second main pivot axis that is stationary relative to the body of the vehicle, between an open position in which it uncovers at least part of a second access to the inside of the vehicle defined by an opening formed in the body, and a closed position in which it shuts the second access to the inside of the vehicle.

Such a door unit enables a user to access the inside of the vehicle by operating the door unit in at least two different modes. In a first mode, the user moves the first tailgate to its open position, thereby releasing the first access defined by the opening formed in the second door. In a second mode, the user moves the second tailgate into its open position, thereby releasing the second access defined by the opening formed in the body. Generally, the opening of the first mode is smaller in size than the opening of the second mode.

In addition, in such a door unit, the user retains the possibility of accessing the inside of the vehicle under all circumstances. In some circumstances, the first tailgate cannot be opened, e.g. because of an obstruction on the roof presenting the first tailgate being superposed thereon. Under such circumstances, since the second main pivot axis is stationary relative to the body of the vehicle, it is still possible to use the second tailgate.

Advantageously, at least a portion of the guide slideway is formed in a roof bar of the vehicle.

Thus, such a door unit does not require significantly structural modifications to be made to the vehicle, and in particular to the body. The slideway is formed in the roof bar of the vehicle, thus making it possible to offer several models of vehicle to users, optionally including the door unit of the invention, by appropriately arranging the roof bars, and without requiring any modification to the body from one model to another of any given vehicle.

Furthermore, since providing roof bars is not very expensive, they can be provided systematically without leading to significant extra cost for the vehicle, so it is not always necessary to have roof bars that differ between models that include the door unit of the invention and models that do not.

Furthermore, since there is no need for the body to differ depending on the model, vehicles are less expensive.

The roof bars then perform two functions: one of supporting a load; and another of guiding the main pivot axis of the first tailgate in translation.

According to an optional characteristic of the door unit of the invention, the slideway comprises:

a portion that is rigidly secured to the body of the vehicle; and a portion that is carried by the second door.

The invention also provides a motor vehicle including a door unit as defined above.

The invention also provides a kit comprising first and second rear doors for a motor vehicle, the first and second doors comprising respective first and second tailgates, the second door being suitable for carrying the first tailgate, in which kit the first door includes hinge means for hinging the first tailgate relative to a vehicle body, which means are fastened to the first tailgate, the first tailgate being pivotally movable relative to the body about a main pivot axis of the hinge means, the kit also including at least one guide slideway for guiding the main axis in order to move the main axis in translation relative to the body in a direction that is substantially parallel to the longitudinal direction of the vehicle, between:

a first position of the main axis corresponding to a first position of the first tailgate; and a second position of the main axis corresponding to a second position of the first tailgate.

Advantageously, the kit includes at least one roof bar forming the slideway or one of the slideways.

BRIEF DESCRIPTION OF THE DRAWINGS

The invention can be better understood on reading the following description, given purely by way of non-limiting example and made with reference to the drawings, in which:

FIG. 3 is a view similar to FIG. 1 showing the first tailgate in an open position;

FIG. 4 is an enlarged view of the FIG. 3 hinge means;

FIG. 5 is a view similar to FIG. 1 in which the second tailgate is in an open position;

FIG. 6 is a view on a larger scale of the FIG. 5 hinge means;

FIGS. 8 and 9 are perspective views of a hinge member and a roof bar of the invention;

FIG. 10 is a view of the roof bar of FIGS. 8 and 9;

FIG. 11 is a view of the hinge member of FIGS. 8 and 9;

FIG. 15 is a view similar to FIG. 12 in which the second tailgate is in an intermediate position; and FIG. 16 is a view similar to FIG. 12 in which the second tailgate is in an open position.

MORE DETAILED DESCRIPTION

Figure 1:
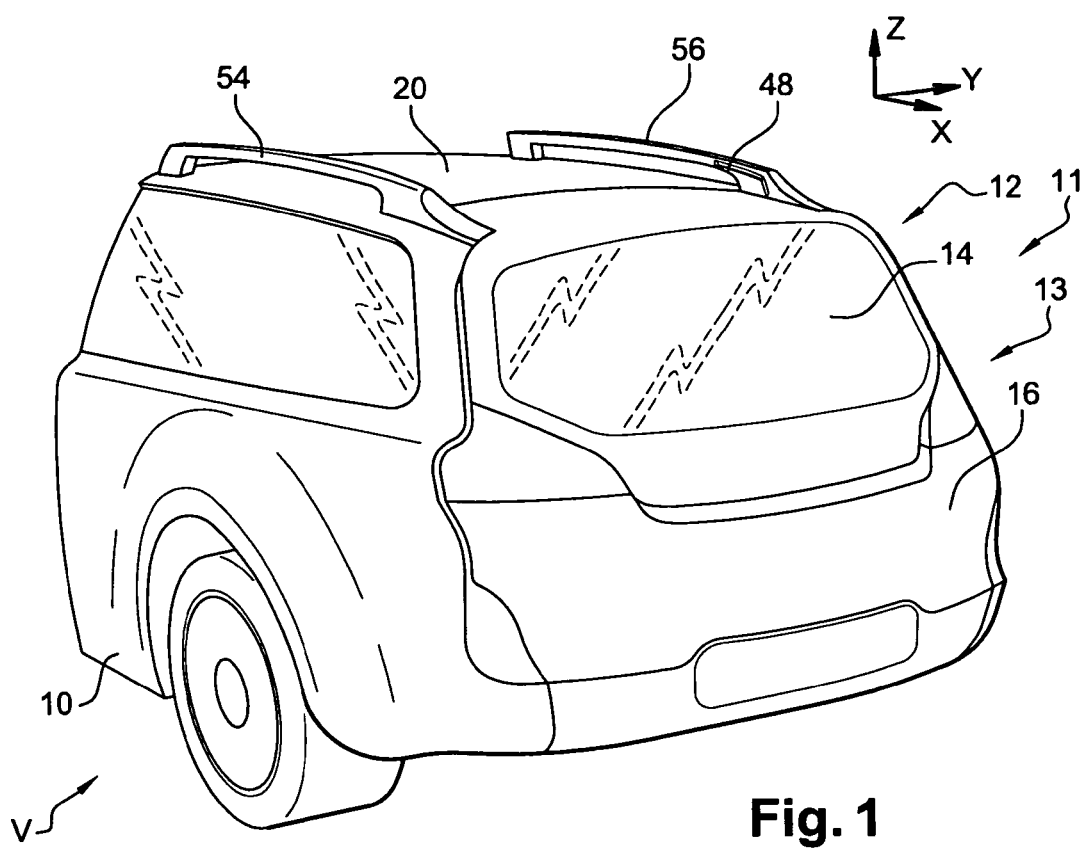
FIG. 1 is a fragmentary perspective view of a vehicle of the invention including a door unit constituting a first embodiment of the invention and comprising first and second tailgates.

In FIGS. 1 to 16, there can be seen mutually orthogonal axes X, Y, and Z corresponding to the conventional longitudinal (X), transverse (Y), and vertical (Z) directions relative to a vehicle. The longitudinal axis extends from the front towards the rear of the vehicle.

FIGS. 1 to 6 show a motor vehicle of the invention given overall reference V.

In the example shown, the vehicle V is a vehicle of the station wagon type having a body 10. The vehicle V also has a door unit 11 comprising first and second rear doors 12 and 13 respectively comprising first and second tailgates 14 and 16. Each of the first and second tailgates 14 and 16 forms respectively a first portion and a second portion of the rear door of the vehicle. The first tailgate 14 is carried by the second door 13.

Figure 2:
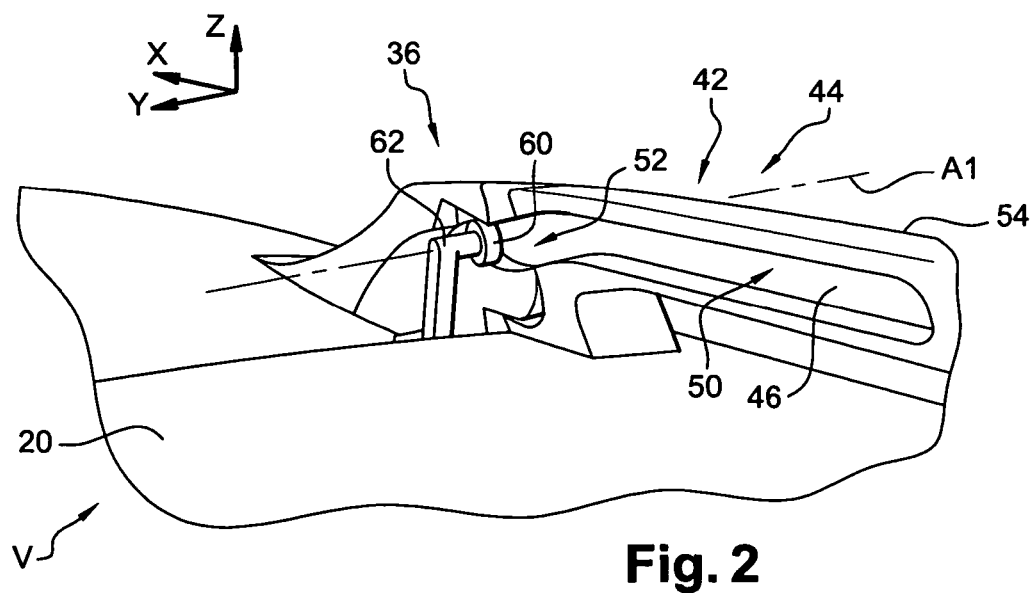
FIG. 2 is a view on a larger scale of hinge means for the FIG. 1 vehicle door unit.
Figure 12:
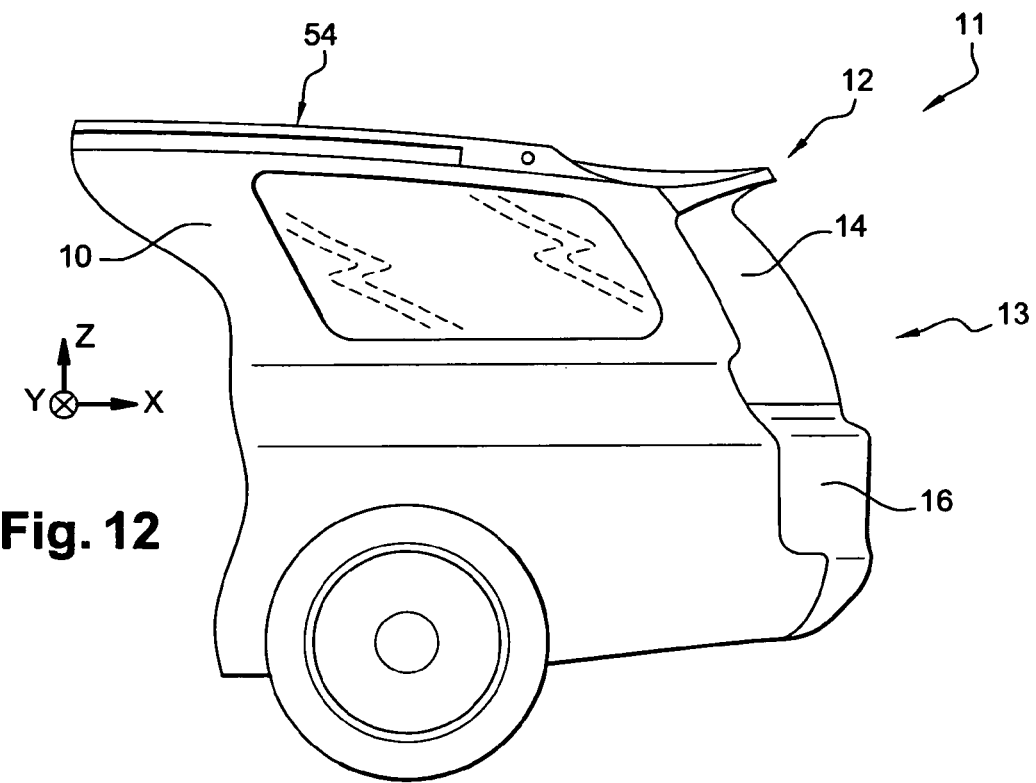
FIG. 12 is a fragmentary side view of a motor vehicle of the invention including a door unit constituting a second embodiment of the invention.

As shown in FIGS. 1 to 4, the first tailgate 14 is movable between:

an open position in which it uncovers at least part of a first access 18 to the inside of the vehicle, and in which it is superposed at least in part on the roof 20 of the vehicle (FIGS. 3 and 4); and a closed position in which it shuts the first access 18 to the inside of the vehicle (FIGS. 1 and 2).

The first access 18 uncovered by the first tailgate 14 when in its open position is defined by an opening 22 formed in the second door 13, as shown in FIG. 3.

As shown in FIGS. 1, 2, 5, and 6, the second tailgate 16 is movable between:

an open position in which it uncovers at least part of a second access 24 that is inside of the vehicle V (FIGS. 5 and 6); and a closed position in which it shuts the second access 24 to the inside of the vehicle V (FIGS. 1 and 2).

The second access 24 is defined by an opening 26 formed in the body 10.

As shown in FIGS. 3 and 5, the vehicle has rear storage space 28 that is subdivided into a top portion 30 and a bottom portion 32 by a separator member 34 that is substantially parallel to the XY plane. The opening 22 gives access to the top portion 30 of the storage space 28, while the opening 26 gives access to both the top and bottom portions 30 and 32 of the storage space 28.

The roof 20 includes a setback 35 extending across the entire width of the roof 20 from the rear end of the roof 20 and extending towards the rear of the vehicle.

Figure 7:
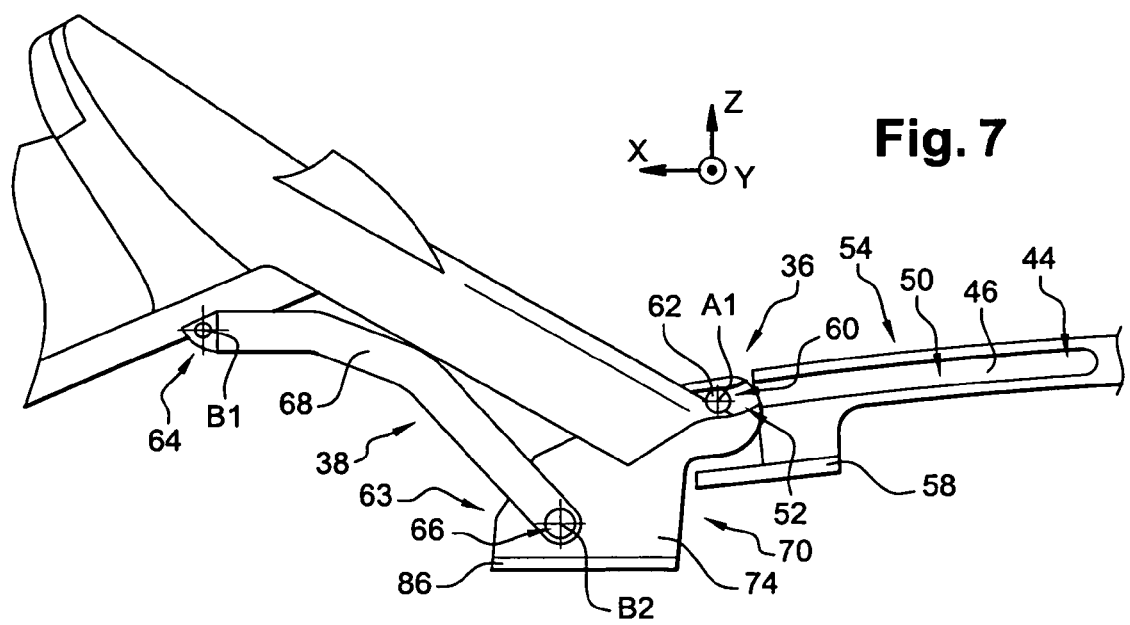
FIG. 7 is a section view of the hinge means of the FIG. 1 door unit.

In order to move the first tailgate 14 between its open and closed positions, the first door 12 has first and second hinge means given respective references 36 and 38, and also shown in FIG. 7.

The first hinge means 36 are suitable for hinging the first tailgate 14 relative to the body 10.

The first hinge means 36 are fastened to the first tailgate 14 and define a first main axis A1 about which the first tailgate 14 can pivot. The first main axis A1 is substantially parallel to the transverse direction Y of the vehicle.

As shown in FIGS. 1 to 6, the first main axis A1 is also movable in translation, in a direction that is substantially parallel to the longitudinal direction X of the vehicle, relative to the body 10 between an open position (FIG. 4) and a closed position (FIG. 2).

Firstly the open position of the first main axis A1 corresponds to the open position of the first tailgate 14. In this open position of the axis A1, the axis is carried by a part 42 that is rigidly secured to the body 10 and stationary relative to the body 10, as shown in FIG. 4. Secondly, the closed position of the first main axis A1 corresponds to the closed position of the first tailgate 14. In this closed position of the axis A1, the axis is carried by the second door 13, as shown in FIG. 2.

As shown in FIGS. 1 and 3, the closed position of the first main axis A1 is the position of the axis A1 that is closest to the rear of the vehicle, while the open position of the first main axis A1 is the position of the axis A1 that is closest to the front of the vehicle.

In addition, the vehicle V has guide means 44 for guiding the first main pivot axis A1, as shown in FIGS. 2, 4, 6, and 7.

These guide means 44 comprise two slideways 46 and 48 suitable for guiding the first main axis A1 in translation relative to the body 10 of the vehicle V in a direction that is substantially parallel to the longitudinal direction X of the vehicle V. The main axis A1 is suitable for moving in the slideways 46 and 48.

With reference to FIGS. 2 and 7, each slideway 46 and 48 comprises first and second portions 50 and 52 that are movable relative to each other. The first portions 50 are rigidly secured to the body 10. Specifically, each first portion 50 is formed in a roof bar 54, 56 of the vehicle. The second portions 52 are carried by the second door 13. The roof bar 56, shown in FIG. 10, includes a fastener plate 58 for fastening the roof bar to the body 10 of the vehicle.

The first hinge means 36 include two bearings 60 that are movable firstly about a respective cylindrical pin 62 embodying the first axis A1, and secondly along the corresponding slideway 46, 48, thereby enabling the first door 14 to move both in pivoting and in translation. Thus, when the bearings 60 are guided by the second portion 52, the first main axis A1 is carried by the second door 13. When the bearings 60 are guided by the first portions 50, the first main axis A1 is carried by the portion that is secured to the body, in this embodiment by the roof bars 54 and 56. Contact between these bearings 60 and the corresponding slideways 46 and 48 can take place either via the bottom portion or via the top portion of the slideway 46 or 48, each slideway 46 and 48 presenting clearance relative to these bearings 60.

The setback 35 allows the first tailgate 14 to move between its open and closed positions. In addition, the setback 35 facilitates access to the inside of the vehicle V, in particular for tall people.

Furthermore, the second hinge means 38 are pivotally movable relative to the first and second tailgates 14 and 16, about respective first and second secondary pivot axes B1 and B2 of the second hinge means 38 of the first tailgate 14. The secondary axes B1 and B2 are substantially parallel to each other and to the transverse direction Y of the vehicle. As shown in FIG. 7, the second hinge means 38 of the first door 14 are fastened to the first tailgate 14 and to a hinge member 74 of the second door 13. The second hinge means 38 are fastened to the first and second tailgates 14 and 16 via pivot connections 64 and 66 embodying the first and second secondary axes B1 and B2. In FIGS. 1 to 7, the second hinge means 38 include two rigid links 68 disposed symmetrically relative to each other on either side of a midplane of the vehicle V that is substantially parallel to the XZ plane.

The second door 13 includes hinge means 70 for the second tailgate 16. The second tailgate 16 is pivotally movable between its open and closed positions about a second main pivot axis A2 of the hinge means 70. The second main axis A2 is stationary relative to the body 10 of the vehicle and is substantially parallel to the transverse direction Y of the vehicle.

With reference to FIGS. 7, 8, 9, and 11, the hinge means 70 comprise the hinge member 74 that is rigidly fitted to the second tailgate 16 and that is stationary relative thereto. The member 74 comprises firstly an orifice 76 suitable for receiving the pivot connection 66 embodying the second secondary hinge axis B2, and secondly a cylindrical pin 80 embodying the second main pivot axis A2 and suitable for being received in a pivot orifice 82 formed in each of the roof bars 54 and 56, as shown in FIGS. 8 and 10. In addition, the hinge member 74 is fastened to the second tailgate 16 by fastener means, e.g. by screws passing through the orifices 84 formed in a plate 86 of the member 74. Finally, the second portion 52 of each slideway 46 and 48 is formed in said hinge member 74.

In order to make utilization of the first tailgate 14 more ergonomic, the first door 12 includes motor-driven means (not shown) suitable for generating torque about the second secondary pivot axis B2 of the second hinge means 38 of the first tailgate 14. Specifically, the motor-driven means comprise means (not shown) for moving the first main pivot axis A1 in translation, e.g. means for applying traction to the first main axis A1.

In the example shown, the second door 13 includes motor-driven means (not shown) suitable for generating torque about the second main pivot axis A2 and enabling the second tailgate 16 to be moved between its open and closed positions.

With reference to FIGS. 2 and 6, the first and second portions 50 and 52 extend each other so that the first main axis A1 is movable between the first and second portions 50 and 52 only when the second tailgate 16 is in the closed position. The hinge member 74 is movable between:
  a position that prevents the first tailgate 14 from moving, corresponding to an open position of the second tailgate 16; and
  a position that allows the first tailgate 14 to move, corresponding to a closed position of the second tailgate 16.

Thus, when the second tailgate 16 is in a position other than its closed position, the first and second portions 50 and 52 do not extend each other in pairs so the first tailgate 14 is prevented from moving in the second portions 52 of the hinge members 74.

In addition, since the first main axis A1 is carried by the second door 13 in the closed position of the first tailgate 14, movement of the second tailgate 16 between its closed and open positions causes the first tailgate 14 to move. In the example shown, the motor-driven means of the second door 13 are deactivated in the open position of the first tailgate 14. Conversely, the motor-driven means of the second door 13 are activated in the closed position of the first tailgate 14. Activation and deactivation of the motor-driven means of the second door 13 are performed by electrical control means for the door unit 11.

FIGS. 12 to 16 show a door unit constituting a second embodiment. In these figures, elements that are analogous to those shown in the preceding figures are designated by identical references.

Figure 13:
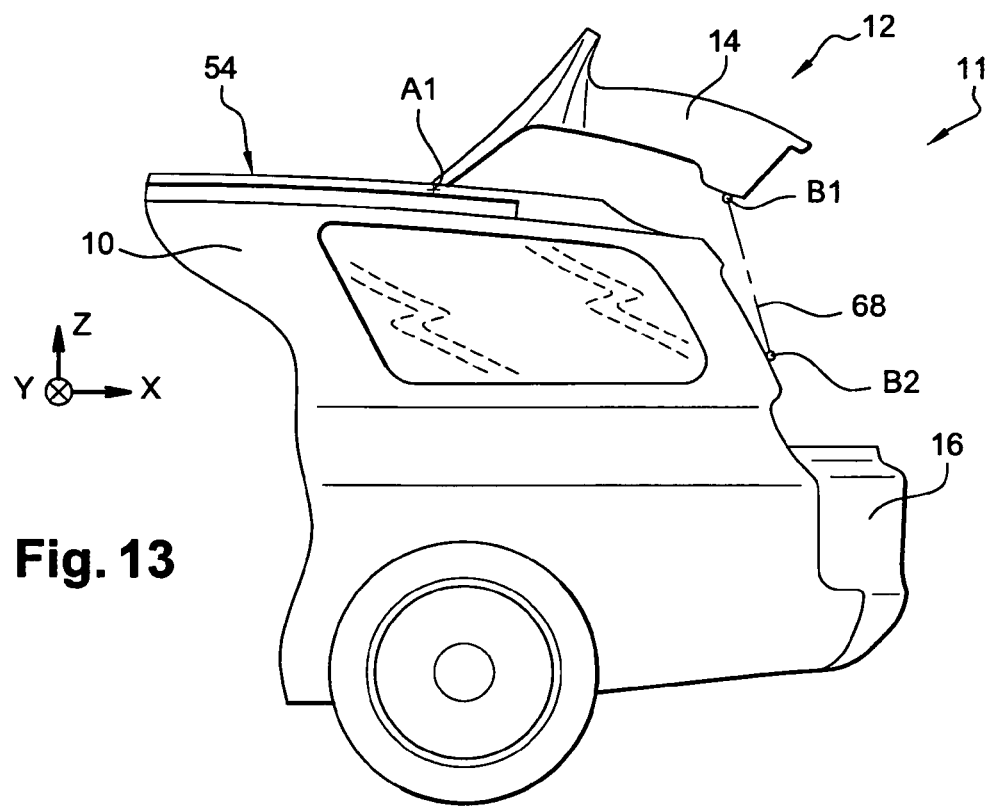
FIG. 13 is a view similar to FIG. 12 in which the first tailgate is in an intermediate position.
Figure 14:
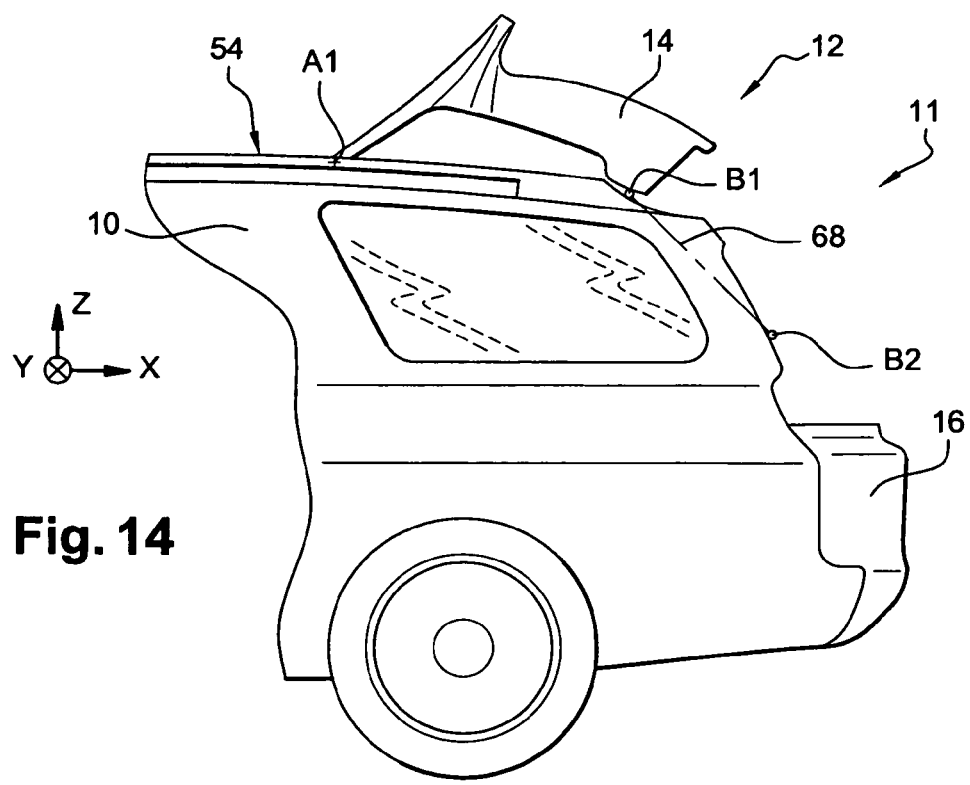
FIG. 14 is a view similar to FIG. 12 in which the first tailgate is in an open position.

As shown in FIGS. 13 and 14, the two rigid links 68 are fastened to the first and second doors 14 and 16 via portions that are different from those in the first embodiment. Consequently, the path followed by the first tailgate 14 of the second embodiment is different from the path followed by the first tailgate 14 of the first embodiment.

Furthermore, the second tailgate 16 has second hinge means 90, specifically, two pneumatic props 92, fastened to the vehicle body and to the second tailgate 16 by means of ball joints 94 and disposed symmetrically relative to each other on either side of a midplane substantially parallel to the XZ plane.

The invention is not limited to the embodiments described above.

The door unit 11 could be in the form of a kit. In the kit, the first tailgate 14 is suitable for being pivotally relative to the body 10 about the main axis A1. The main axis A1 is suitable for moving in the slideways 46 and 48 between a first position corresponding to the open position of the first tailgate 14 and a second position corresponding to the closed position of the first tailgate 14.

The kit also includes the roof bars 54 and 56 that form the slideways 46 and 48.

The second hinge means could include pneumatic props taking the place of the rigid links.

In addition, it should be observed that the characteristics of the door 12, of the door unit 11, and of the roof bars 54 and 56, as described above, can be implemented independently of one another and independently of the fact that the door includes a slideway for guiding the main pivot axis of the tailgate and suitable for guiding the main pivot axis in translation relative to the body of the vehicle in a direction that is substantially parallel to the longitudinal direction of the vehicle.

Independently of the other characteristics, it is also possible to provide a rear door for a motor vehicle, the door including a tailgate, in which the door has means for hinging the tailgate relative to the body of the motor vehicle, which means are fastened to the tailgate, the tailgate being pivotally movable relative to the body about a main pivot axis of the hinge means, the main axis being suitable for moving in at least one slideway for guiding the main axis in pivoting and in translation relative to the body, in a direction that is substantially parallel to the longitudinal direction of the vehicle, between:
  an open position corresponding to an open position of the tailgate in which the tailgate uncovers at least part of an access to the inside of the vehicle and is superposed at least in part on a roof of the vehicle; and
  a closed position corresponding to a closed position of the tailgate in which the tailgate shuts the access to the inside of the vehicle.

What is claimed is:

1. A unit of first and second rear doors for a motor vehicle, the first and second rear doors respectively comprising first and second tailgates, the second rear door carrying the first tailgate, wherein the first rear door includes hinge means for hinging the first tailgate relative to a vehicle body, the hinge means being fastened to the first tailgate, the first tailgate being pivotally movable relative to the vehicle body about a main pivot axis of the hinge means, the main pivot axis being movable in at least one guide slideway for guiding the main pivot axis in translation relative to the vehicle body in a direction that is substantially parallel to a longitudinal direction of the motor vehicle, between:
  an open position corresponding to an open position of the first tailgate, wherein the tailgate uncovers at least part of an access to an inside of the motor vehicle and is superposed, at least in part, on a roof of the vehicle; and
  a closed position corresponding to a closed position of the first tailgate, wherein the first tailgate shuts the access to the inside of the vehicle.

2. The unit according to claim 1, wherein the access uncovered by the first tailgate in its open position is defined by an opening formed in the second door.

3. The unit according to claim 1, wherein the hinge means for hinging the first tailgate relative to the body is first hinge means, the first door comprises second hinge means for hinging the first tailgate and the second door relative to each other, the second hinge means is fastened to the first tailgate and to the second door, the second hinge means is pivotally movable relative to the first tailgate and to the second door respectively about first and second secondary pivot axes of the second hinge means.

4. The unit according to claim 3, further comprising motor-driven means for generating torque about the second secondary pivot axis of the second hinge means.

5. The unit according to claim 4, wherein the motor-driven means comprises means for transmitting the torque to the second secondary pivot axis.

6. The unit according to claim 4, wherein the motor-driven means comprises means for movement in translation relative to the vehicle body.

7. The unit according to claim 1, wherein the access uncovered by the first tailgate is a first access and the main pivot axis of the first tailgate is a first main axis, the second tailgate is pivotally movable relative to the vehicle body, about a second main pivot axis that is stationary relative to vehicle body, between an open position wherein the second tailgate uncovers at least part of a second access to the inside of the vehicle defined by an opening formed in the vehicle body, and a closed position wherein the second tailgate shuts the second access to the inside of the vehicle.

8. The unit according to claim 1, wherein at least a portion of the guide slideway is formed in a roof bar of the vehicle.

9. The unit according to claim 1, wherein the slideway comprises:
   all a secured portion that is rigidly secured to the vehicle body; and
   a carried portion that is carried by the second rear door.

10. A kit comprising first and second rear doors for a motor vehicle, the first and second rear doors comprising respective first and second tailgates, the second rear door carrying the first tailgate, wherein the first rear door comprises hinge means for hinging the first tailgate relative to a vehicle body, the hinge means being fastened to the first tailgate, the first tailgate being pivotally movable relative to the vehicle body about a main pivot axis of the hinge means,
   the kit further comprising at least one guide slideway for guiding the main axis in translation relative to the vehicle body in a direction that is substantially parallel to a longitudinal direction of the vehicle between:
   a first position of the main axis corresponding to a first position of the first tailgate; and
   a second position of the main axis corresponding to a second position of the first tailgate.

11. The kit according to claim 10, including at least one roof bar forming the guide slideway or one of the guide slideways.

12. A motor vehicle comprising:
   a vehicle body;
   a unit of first and second rear doors, the first and second rear doors respectively comprising first and second tailgates, the second rear door carrying the first tailgate;
   wherein the first rear door comprises hinge means for hinging the first tailgate relative to the vehicle body, the hinge means being fastened to the first tailgate, the first tailgate being pivotally movable relative to the vehicle body about a main pivot axis of the hinge means, the main axis being movable in at least one guide slideway for guiding the main axis in translation relative to the vehicle body in a direction that is substantially parallel to a longitudinal direction of the vehicle between:
      an open position corresponding to an open position of the first tailgate, wherein the first tailgate uncovers at least part of an access to an inside of the vehicle and is superposed, at least in part, on a roof of the vehicle; and
      a closed position corresponding to a closed position of the first tailgate, wherein the first tailgate shuts the access to the inside of the vehicle.

13. The unit according to claim 6, wherein the means for movement in translation applies a traction to the main pivot axis.

* * * * *